United States Patent

[11] 3,593,099

| [72] | Inventor | Hans K. Scholl |
| | | 108 Franciscan Drive, Vallejo, Calif. 94590 |
| [21] | Appl. No. | 844,500 |
| [22] | Filed | July 24, 1969 |
| [45] | Patented | July 13, 1971 |

[54] AUTOMATIC BATTERY TESTER WITH RECORDING MEANS FOR BATTERY PERFORMANCE
2 Claims, 9 Drawing Figs.

[52] U.S. Cl. .................................................. 320/13,
320/39, 320/45, 320/48, 324/29.5, 340/249
[51] Int. Cl. .................................................. H02j 7/00
[50] Field of Search .................................... 320/4, 19,
13, 22, 39, 40, 43, 44, 45, 48, 37, 38; 324/29.5;
340/249

[56] References Cited
UNITED STATES PATENTS

| 2,582,460 | 1/1952 | Salzberg | 320/48 |
| 2,763,820 | 9/1956 | Fielder | 320/45 |
| 2,835,862 | 5/1958 | McNutt | 320/45 |
| 3,350,635 | 10/1967 | Mesch | 324/29.5 |
| 3,392,328 | 7/1968 | Figg | 320/48 |
| 3,417,307 | 12/1968 | Kosa et al. | 320/14 |
| 3,445,744 | 5/1969 | Henderson et al. | 320/40 |
| 3,470,441 | 10/1969 | Ford et al. | 320/40 |
| 3,500,167 | 3/1970 | Appelgate et al. | 320/48 |

Primary Examiner—J. D. Miller
Assistant Examiner—John M. Gunther
Attorney—Eckhoff and Hoppe ABSTRACT: An automatic battery discharger and tester for recording the performance of a battery being discharged under a selected resistance load wherein the battery's current and voltage are continuously monitored and compared against preselected current and voltage values, and includes means for maintaining a constant discharge current by varying the load resistance in response to any deviations of the battery current against the preselected current value, and similarly includes means to disconnect the battery from the load and interrupt the test when the battery voltage drops below a preselected voltage value signifying the discharged state of the battery.

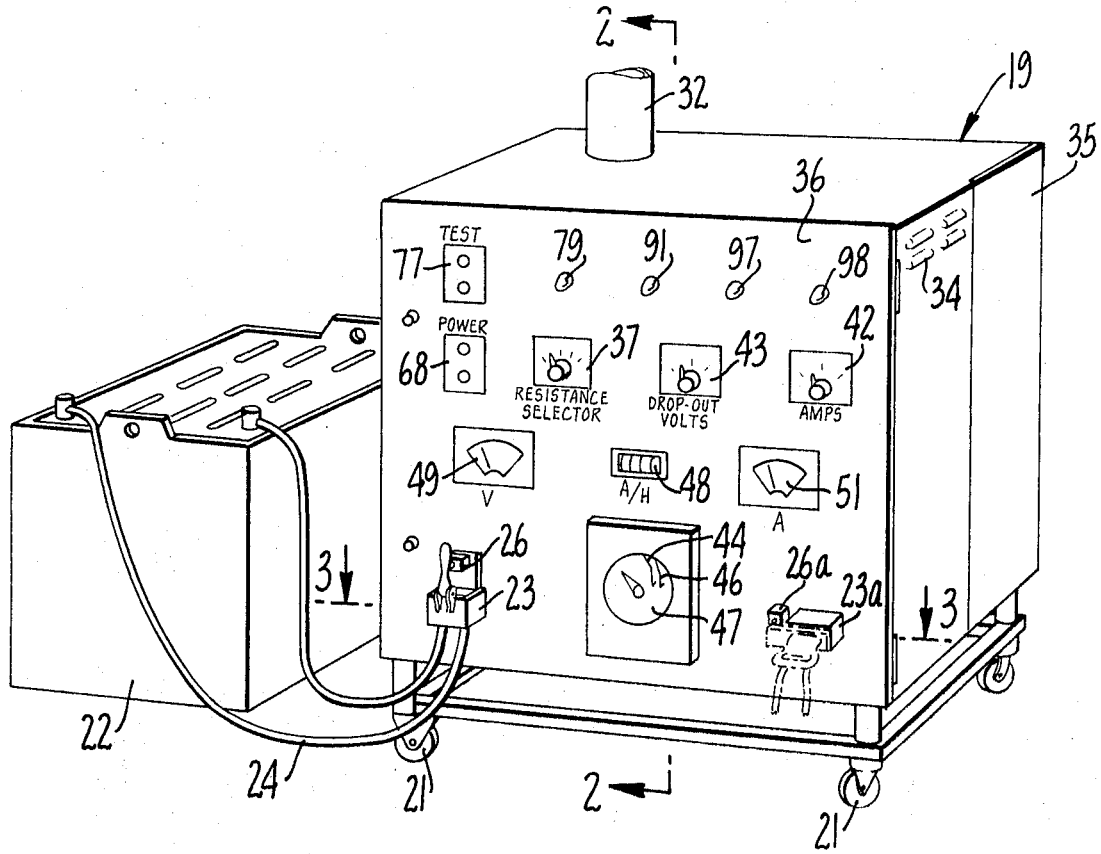
FIG. 1.
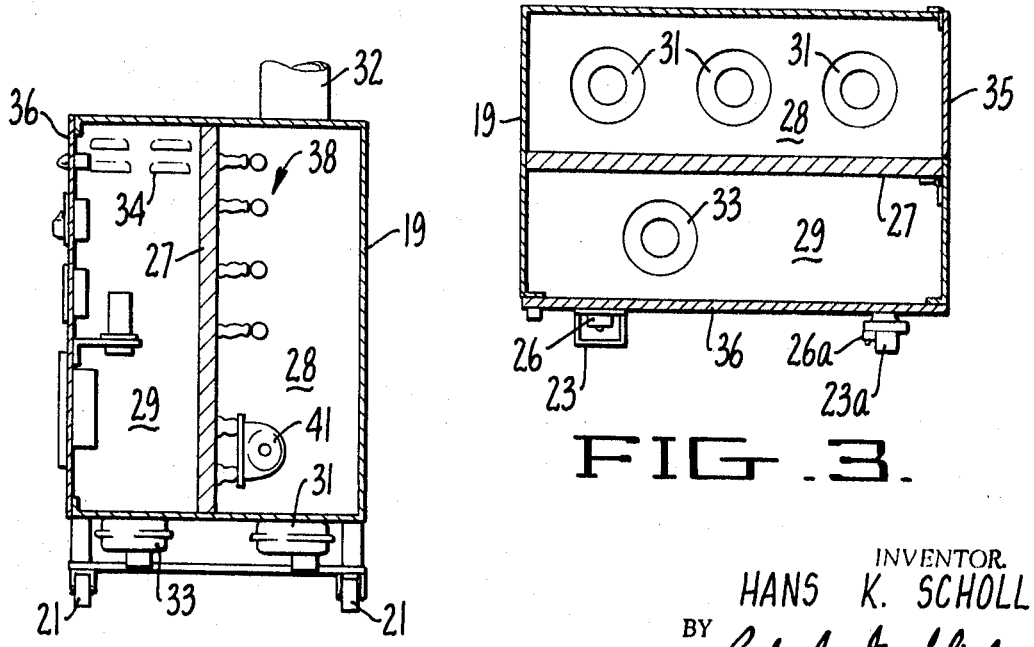
FIG. 2.
FIG. 3.
INVENTOR.
HANS K. SCHOLL
BY Robert F. Slick
ATTORNEY INVENTOR.
HANS K. SCHOLL
BY Robert N. Slick
ATTORNEY INVENTOR.
HANS K. SCHOLL
BY Robert G. Slick
ATTORNEY

AUTOMATIC BATTERY TESTER WITH RECORDING MEANS FOR BATTERY PERFORMANCE

SUMMARY OF THE INVENTION

This device was developed in response to the need of large battery users, such as industrial plants and warehouses, to know the condition and performance of their batteries. While this invention could be used to discharge and interpret the performance and electric characteristics of many types of batteries, it has particular usefulness for indicating the condition and weakness of large rechargeable lead-acid cell batteries such as those used in electric forklift trucks and other heavy-duty electrical implements and vehicles. These vehicles are run under varying load and conditions and schedules such that one battery may be overtaxed while another is underloaded, both conditions which will lead to a shortened battery life. Similarly, these batteries may be running with a defective cell or faulty internal connection which is difficult to detect without time-consuming manual testing. To insure that these batteries carry their proper workload and are in top working condition it is advisable to test them on a periodic schedule for comparison with their optimum performance specification. When these test results are maintained in a standardized recorded profile a determination of the quality of various manufacturers may be made for use in future purchasing. To accomplish this it is necessary that the tests be made under standardized procedures and with a minimum of human supervision. The device of this invention is designed to do this and it has been found that batteries tested and analyzed with this device can be made to produce a greater output with a comparably longer life cycle.

It is therefore a principal object of the present invention to provide a test instrument for automatically discharging batteries under preselected electromatic conditions and to monitor and record the electromatic characteristics of the battery under test, so that a determination of its capacities and/or weaknesses may be made.

It is another object of the present invention to monitor a battery's electromatic discharger values and compare them with preselected test values.

A further object is to maintain an electromatic relationship between preselected test values and a battery's discharge values such that the battery will be discharged at a preselected rate.

Another object is to provide a variable load resistance load on a battery and to monitor the battery's current value and compare this value with a preselected base current value and to vary the load resistance in response to any differential of these current values so as to maintain a constant, preselected discharge current.

Still another object is to monitor a battery's discharge voltage and compare it with a preselected base voltage and to provide means responsive to the battery's voltage dropping below the base voltage to disconnect the battery from the load and interrupt the test.

A further object is to provide a portable battery discharger using commercially available components wherein the control circuit is isolated from the load circuit by housing each in separate compartments while providing forced ventilation to dissipate the heat energy generated in the load circuit compartment.

Yet another object is to provide a test battery discharger having safety devices to insure that the battery is properly connected to the tester and to provide means to automatically disconnect the battery if insufficient load resistance is available which might cause a too high current drain on the battery.

DESCRIPTION OF THE DRAWINGS

FIG. 1 is a perspective view of a preferred embodiment of the present invention illustrating the housing and visible instrumentation in position adjacent to and connected with a battery to be tested.

FIG. 2 is an elevational section of the device of FIG. 1 and taken substantially in the plane of line 2-2 thereof.

FIG. 3 is a plan section of the device of FIG. 1 and taken substantially in the plane of line 3-3 thereof.

DESCRIPTION OF THE PREFERRED EMBODIMENTS

Figure 4:
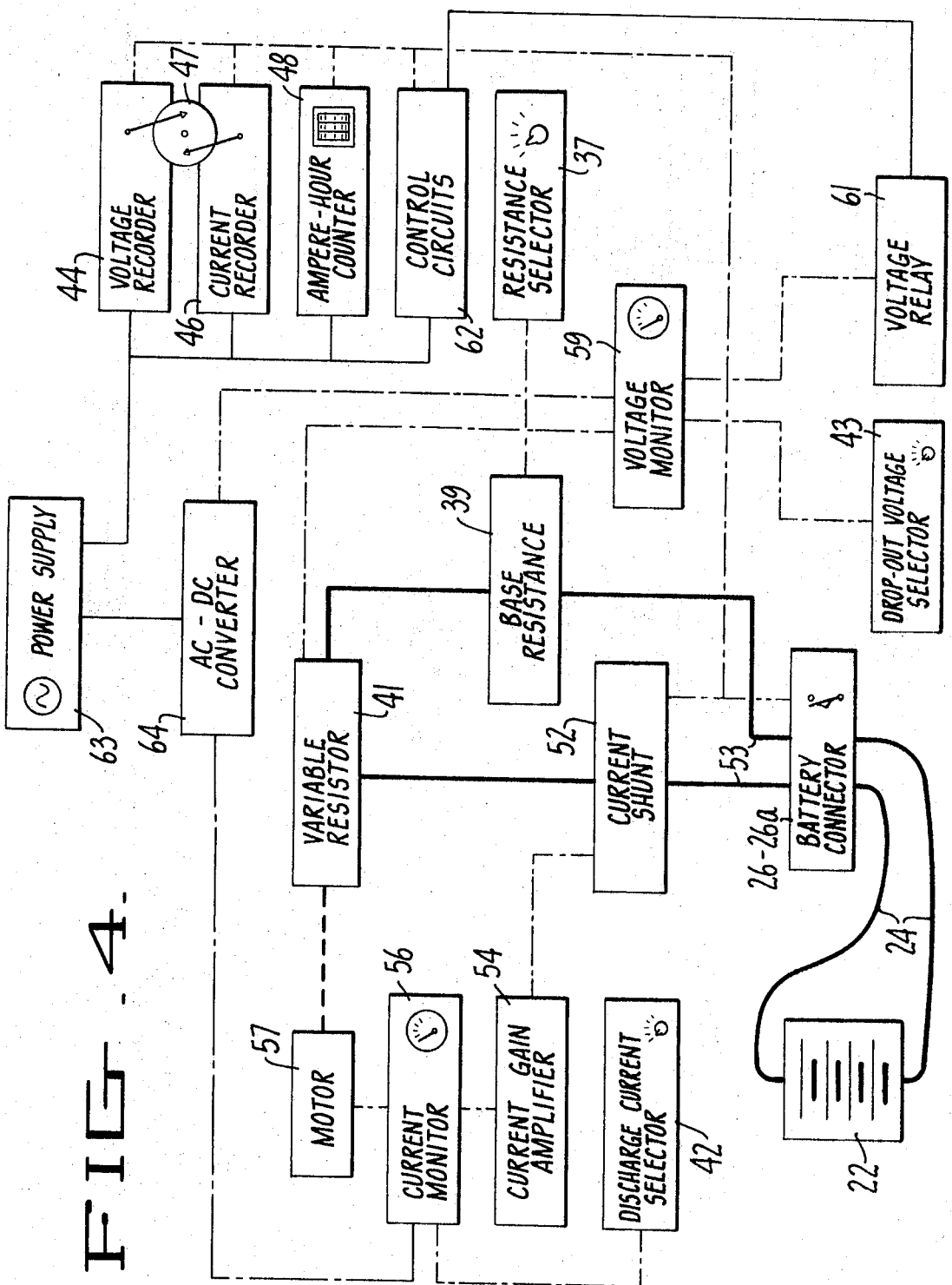
FIG. 4 is a diagram of the electrical components utilized in the present invention and illustrating the interconnection thereof.

Generally the battery discharger of the preferred embodiment of the present invention includes a load resistance, a current monitor and a voltage monitor interrelated such that a battery may be discharged at a preselected rate until a preselected discharge condition is achieved.

The resistance load is made up of a preselected base resistance compiled from a bank of resistors and variable resistance derived from a motor-driven rheostat. The rheostat motor is driven in response to the output of a control circuit to either increase or decrease the mean load resistance and thus control the rate of discharge of the battery. The current monitor compares the instantaneous battery current with a preselected current value, any difference of which is used to drive the rheostat motor in such manner to hold the battery discharge current at its preselected value. The voltage monitor compares the instantaneous battery voltage with a preselected voltage value such that when the battery voltage drops to a fully discharged value a relay is tripped to interrupt the test and disconnect the battery from the load. During the discharge sequence the current and voltage characteristics of the battery are measured and recorded and the potential work output tabulated. Thus a record of the performance of the battery is compiled which may be analyzed to determine the battery's condition and kept for future reference.

Referring to FIG. 1, the automatic battery discharger and tester of the present invention includes a portable cabinet 19 having wheels 21, one pair which are preferably casters, for moving the unit into position adjacent a battery 22 to be tested. The cabinet has receptor terminals for accepting standard connectors 23 or 23a for attaching the battery cables 24 to the unit in a well-known manner. These connectors are of the plug and receptacle type and to insure that proper contact is achieved each receptor includes a feller switch 26, 26a which will close when the plug is in the "home" position.

The cabinet is partitioned by an insulated panel 27 into a load resistance compartment 28 and a control housing compartment 29. The load resistance compartment is supplied with forced ventilation by thermostatically controlled fans 31 and outlet duct 32 for dissipating the heat generated by the load resistors during a discharge test. A removable side panel 35 provides for maintenance and inspection of the resistor compartment. A smaller ventilating system of fan 33 and louvers 34 is incorporated in the control compartment.

An access door 36 makes up the front panel of the cabinet and the control components and recording devices are conveniently attached thereto for ease of assembly and maintenance. Similarly the insulated panel 27 may be hinged to allow easy access to the components in compartment 28.

Looking to FIG. 4 it will be seen that the preferred embodiment includes value selection and programming devices, monitoring devices, recording devices, a control circuit and a power supply.

The selector or programming devices comprise selector switches located on the front panel 36 which are used for selecting the parameters under which the test is to be run. They include: the resistance selector 37 which selects and compiles resistance values from a bank of resistors 38 to form a base resistance 39 which when added to the variable resistor 41 forms the resistance load through which the battery is discharged, a discharge current selector 42 which selects the rate of discharge, and a dropout voltage selector 43 which selects the battery voltage at which the test is deemed to be completed.

The recording devices include a voltage recorder 44 and a current recorder 46 which are conveniently compiled on the same chart 47 for easy comparison, and ampere-hour counter 48 which compiles the total work output of the battery during the test, and a voltmeter 49 and ammeter 51 for indicating the instantaneous battery voltage and current values.

The monitoring devices include the battery connector switch 26 and 26a which indicate that the battery is properly plugged into the unit, a current shunt 52 for supplying a proportional signal from the battery main powerlines 53 to a current-gain amplifier 54 and thence to a current monitor 56 which compares the battery's instantaneous current value with the preselected discharge current value and acts to balance any difference between them by varying the resistance load with motor 57 driving variable resistor 41. The voltage monitor 59 compares the instantaneous battery voltage with the preselected dropout voltage and trips voltage relay 61 when the battery's voltage indicates that this discharged level is reached. The voltage monitor and voltage relay are also used with a sensing means to indicate that the variable resistor has swung to its highest resistance value and that there is not enough base resistance available. In which case the sensing means will cause the voltage relay to be tripped through the voltage monitors and stop the test until a larger base resistance is selected.

The control circuit 62 includes a feedback network to insure that the system in functioning properly and in the specified sequence. The power supply 63 includes an AC-DC converter 64 and together they supply external power to the various devices and controls for carrying out the test.

Figure 5:
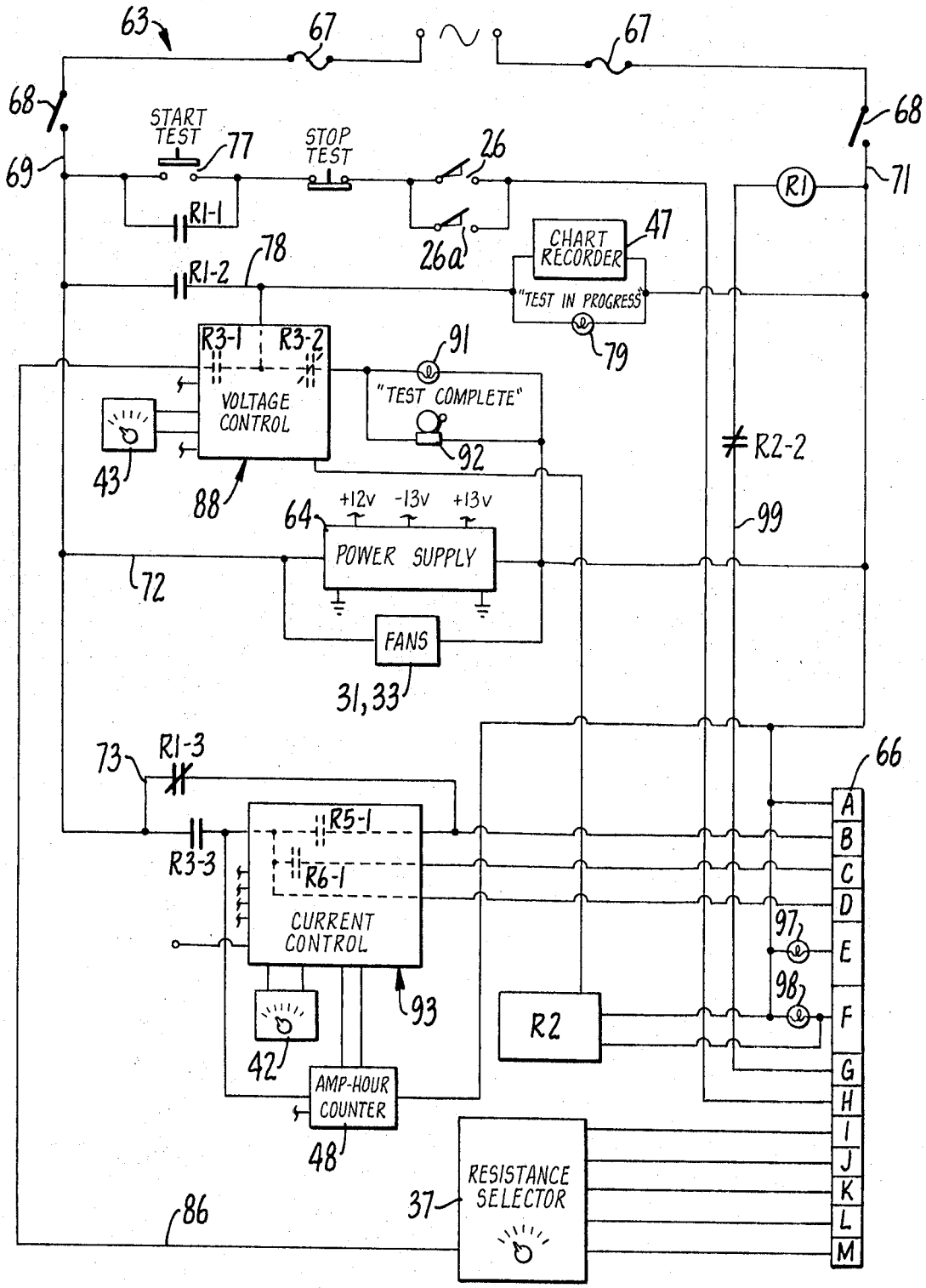
FIG. 5 is an electrical wiring diagram of certain of the components of the control as used in the preferred embodiments of the present invention and their connection to a lettered terminal block which is situated between the control compartment and the load resistance compartment.
Figure 6:
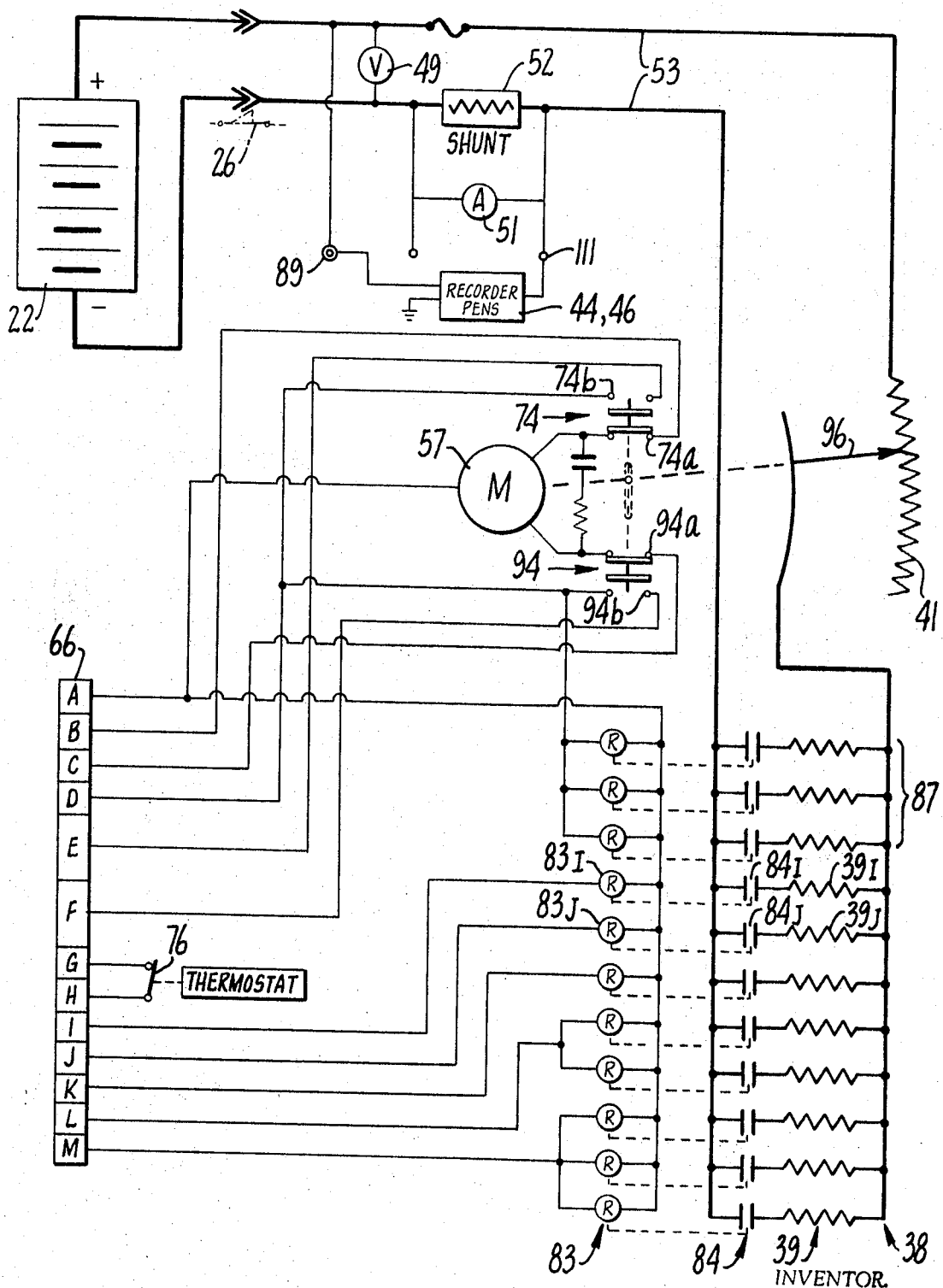
FIG. 6 is an electrical wiring diagram of certain of the components of the load resistance circuit and battery connectors as used in the preferred embodiment and their connection to the lettered terminal block.

FIGS. 5 and 6 show a typical wiring diagram of the preferred embodiment of the present invention in which FIG. 5 illustrates the components in the control compartment 29 while FIG. 6 generally illustrates the components in the load resistance compartment 28, with the lettered terminal block 66 being along the insulated panel 27 and electrically interconnecting the two compartments.

Looking to FIG. 5 it will be seen that AC power may be supplied through fuses 67 and power switches 68 to lines 69 and 71. Thus when switches 68 are closed power is supplied through line 72 to the AC-DC converter power supply 64 and thence to the various control circuits and to the ventilating fans 31 and 33. Similarly power is supplied through line 73 and normally closed relay contacts R1-3 to terminal B and then to rheostat position switch 74a. At the start of the test it is desired that the variable resistor 41 be near its maximum resistance value to obviate a sudden surge on the battery. To accomplish this power will be supplied to motor 57 to drive the rheostat 41 toward its maximum value at which time position switch 74a is opened.

At this point the operator may select or program the parameters under which the battery is to be tested by setting the dropout voltage selector 43, the discharge current selector 42 and the resistance selector 37. If similar batteries are to be tested these selections would already be made and it would only be necessary to connect the next battery and start the test sequence. In this case all of these batteries would be tested under like conditions and their performance could be easily compared.

Assuming that the battery plug is properly connected and that one of the connector switches 26 is closed and further that the thermostatic override switch 76 in compartment 28 is cool and closed, it will be seen that when the "start test" button 77 is closed the coil of relay R1 is energized. R1 in turn closes its contacts R1-1 to hold the power on R1 while contact R1-2 closes to supply power through line 78 to the chart recorder and indicate a "test in progress" by lighting lamp 79. Similarly contact R1-2 supplies power through the already closed contact R3-1 through line 86 to the resistance selector 37.

Figure 9:
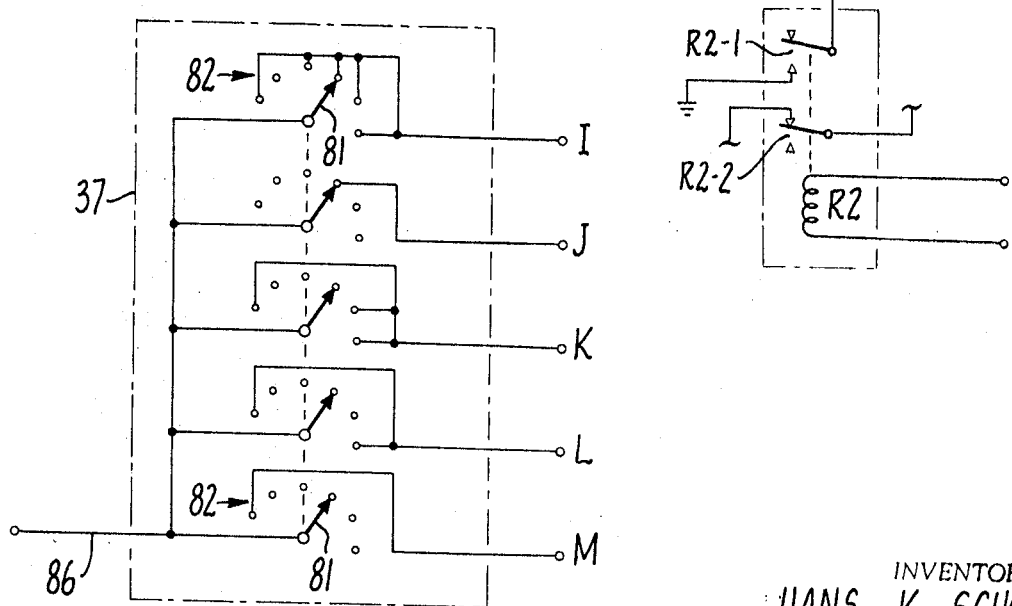
FIG. 9 is a schematic of the internal wiring connecting the switch contacts of the load resistance selector.

As soon as FIG. 9 resistance selector switch 37 has a plurality of coupled switch blades 81 engageable with a plurality of switch contact combinations 82. By interconnecting the contacts in a desired pattern it will be seen that power may be supplied to lines I through M in different combinations for each switch setting. Lines I through M in turn control relays 83 and their respective contacts 84 to place successive load resistors 39 from resistor bank 38 in parallel with the battery powerlines 53. For instance, in the illustrated setting, line 86 would supply power to lines I and J, across terminals I and J to the coils of relays 83I and 83J, closing contacts 84I and 84J and connect resistors 39I and 39J as part of the base resistance between powerlines 53. Each resistance selector switch setting will in turn energize different relay combinations to add other resistors and make up different base resistance values. In the preferred embodiment certain resistors 87 are always included in the base resistance and their relays receive power through terminal D.

The voltage control 88 monitors the battery voltage at terminal 89 and compares it with a preset voltage value selected by the voltage selector switch 43. As soon as the battery voltage drops below this base voltage a signal is produced which operates a relay R3 (see FIGS. 5 and 8) causing contacts R3-1 to open and deenergize the resistor relays 83 and disconnect the base resistance load. Contacts R3-2 then close and light a "test complete" lamp 91 and signal an audible alarm 92. Similarly contacts R3-3 open and disconnect the current controls 93 and the power supplied to terminals B, C and D.

Figure 8:
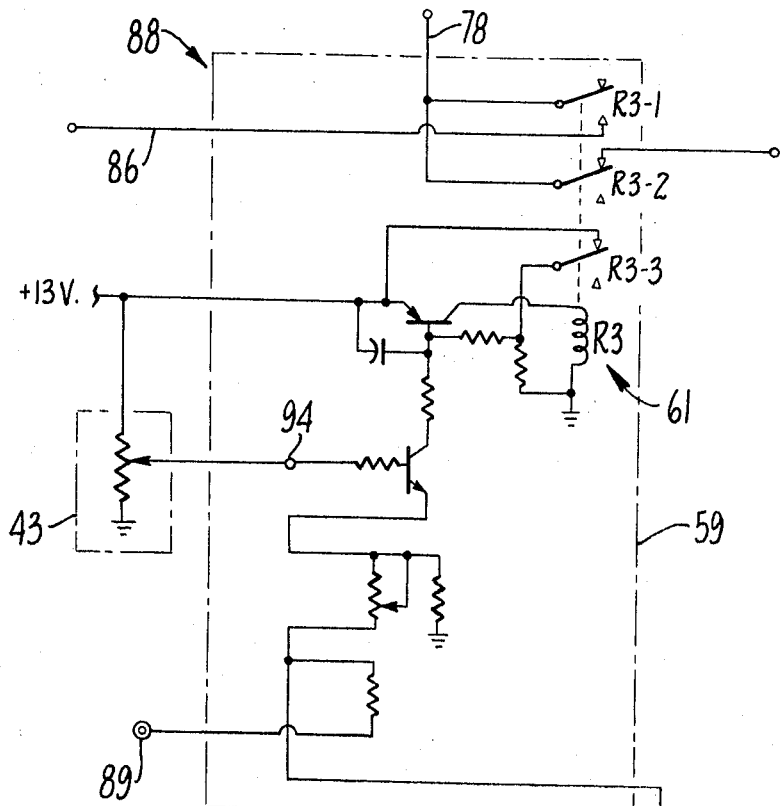
FIG. 8 is a schematic of the voltage monitoring and comparing controls.

Looking to FIG. 8 it will be seen that when the battery voltage at terminal 89 drops sufficiently below the voltage at 94 it causes a latch circuit to operate the coil of relay R3. Another relay R2 may similarly destroy the balance in the voltage control causing relay R3 to operate. Relay R2 acts as a safety against shorting the battery and is operated when the variable resistor 41 reaches its maximum resistance as detected by position switch 94b.

As mentioned earlier the variable resistor or rheostat 41 is driven by a motor 57 in response to the differential between the batteries current and a preselected discharge current value. When the current from the battery is too high, relay contacts R5-1 will close and supply power from line 69 through contacts R3-3 to terminal B. From terminal B the power continues through position switch 74a, motor 57 and back through terminal A to line 71 to drive the motor and rheostat contact 96 to increase the resistance through the rheostat. When the battery current is low, relay contacts R6-1 close and supply power from line 69 through contacts R3-3, to terminal C, through position switch 94a and motor 57 to terminal A and line 71. This reverses the drive of the motor and contact 96 to decrease the resistance of the rheostat. If the motor drives the rheostat to its minimum resistance value position switch 74b will allow power from terminal D to terminal E and light "increase resistance" lamp 97 to indicate this condition so that the base resistance may be checked. If the motor drives the rheostat to its extreme maximum resistance value, power will pass from terminal D through position switch 94d to terminal F and light "decrease resistance" lamp 98. In such case relay R2 is also tripped, closing contact R2-1, upsetting the balance in the voltage control circuit 88 and operates relay R3 to disconnect the battery and interrupt the test as mentioned earlier. Relay R2 also may have normally closed contacts R2-2 in test line 99 which disconnects relay R1 from power while allowing the motor to move the rheostat contact from its highest setting with power through contact R1-3.

Figure 7:
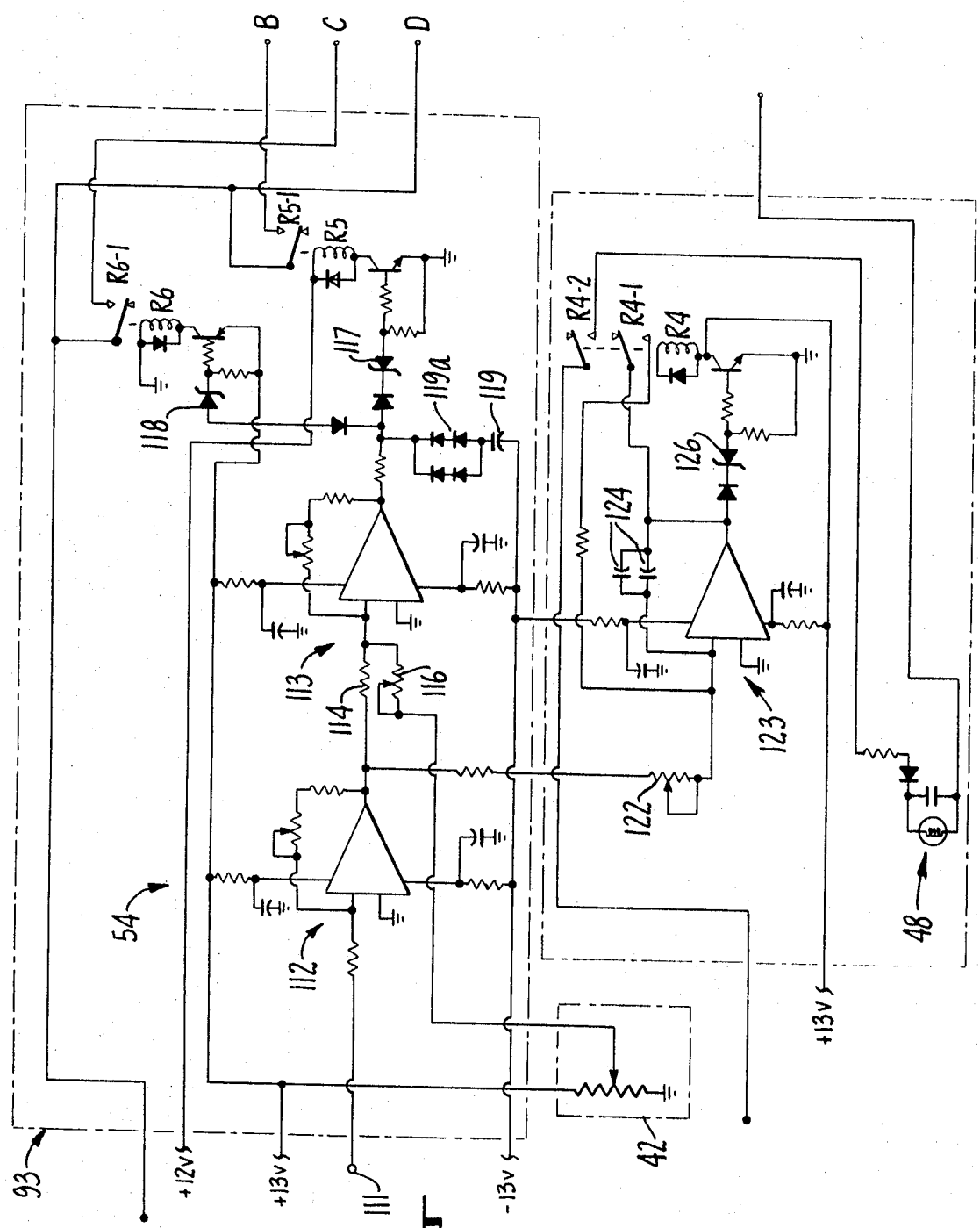
FIG. 7 is a schematic of the current monitoring, amplifying and comparing controls.

FIG. 7 shows a typical schematic for controlling relays R5 and R6 and for pulsing the ampere-hour counter. From the battery current shunt 52 a proportional current value is taken at terminal 111 and provides an input signal to a first operational amplifier 112 where the signal is amplified and fed into a second operational amplifier 113 through resistor 114. Also connected to the input of the second amplifier 113 is an input from ground through the discharge current selector 42 and variable resistor 116. As long as the two signals to the second amplifier 113 are equal the net input will be zero. Variations of these signals will produce a positive or negative input to the second amplifier 113. This signal is then amplified and appears as a positive or negative output on the amplifier 113. Zener diodes 117 and 118 are connected in the circuit to the relay coils of relay R5 and relay R6. These diodes allow currents to pass if the potential is greater than say 10 volts. In this way the diodes 117 and 118 prevent a constant hunting of the system. A time delay capacitor 119 is also included for this purpose and, together with the back-to-back diodes 119a, functions to maintain a constant voltage (for a short time interval) at the output of the second amplifier 113 whenever a change is made. In this manner relays R5 and R6 control the constant torque motor 57.

The ampere-hour counter circuit works off the output of the first amplifier 112. This signal is fed through a calibrating rheostat 122 to a third amplifier 123. From there two capacitors 124 are charged until the voltage output of the third amplifier 123 rises to a value, of say 10 volts, which overcomes a Zener diode 126 and allows the capacitors 124 to discharge through the coil of relay R4. This cycle repeats itself and provides a measure of amperes in the circuit. Relay R4 operates the ampere-hour counter 48 which accumulates the pulses.

Being portable, the battery discharger and tester may be moved to a position adjacent the battery to be tested. This is particularly desirable where the batteries are large and heavy and are generally housed in predesignated cribs.

With the tester so positioned and connected to a suitable power source the operation is fairly simple and automatic. The power switch 68 is closed supplying external power to the cooling fans 31 and 33, the AC-DC converter 64 and control circuits 62 and lights "power on" lamp 127. At this time power is supplied through normally closed contact R1-3 to drive motor 57 until rheostat 41 is near its maximum resistance value. The battery to be tested is plugged into one of the connectors 23 or 23a mounted on the face of panel 36 with feeler switches 26 or 26a insuring proper connection. Next the operation may manipulate the resistance selector switch 37, the current selector 42 and the voltage selector 43 to program the proper values for the battery under test. The "start test" button 77 is pushed and supplies power through the coil of relay R1 which in turn closes contact R1-1 to hold relay R1 in, closes contact R1-2 to supply power to the chart recorder and light "test in progress" lamp 79, and opens contact R1-3.

With the control circuit actuated, relay R3 will position contacts R3-1 and R3-3 in their closed condition and open contact R3-2. Power is now supplied through contact R3-3 to terminal D and in turn closes the relay contacts of resistors 87. Power is similarly supplied through contacts R3-1 and line 86 to the resistance selector 37 which in turn places the preselected base resistance between the battery powerlines 53.

At this time the control circuit and current monitor will compare the battery current value derived across the current shunt 52 with the preselected current value. If a difference in these values is detected, power supplied through either relay contacts R5-1 or relay contacts R6-1 will cause motor 57 to increase or decrease the resistance across rheostat 41 to maintain a constant discharge current.

If the variable resistor 41 should swing to its extreme end points either position switch 74b or 94b would supply power from terminal D to either lamp 97 or lamp 94 and indicate to the operator to increase or decrease the base resistance value on resistance selector 37.

During the test the battery voltage and current values are traced on the recorder graph 47 and the work output totalized on the ampere-hour counter 48. The voltmeter 49 and ammeter 51 indicate the instantaneous battery values.

The voltage is also monitored continuously between points 89 and 94. As soon as the battery voltage drops below the preselected value, relay R3 is operated which opens contacts R3-1 to remove the power from line 86 and drop out the resistance relays 83 controlled by the resistance selector 37 while contact R3-3 opens to drop out resistors 87. Similarly contacts R3-2 close to light the "test complete" lamp 91 and sound an audible alarm with buzzer 92.

If during the test variable resistor 41 swings to its extreme maximum resistance value the test will be terminated so as not to short the battery. Thus it will be seen that when position switch 94b is closed power is supplied from terminal D to terminal F and the coil of relay R2. Closing contact R2-1, in turn, upsets the balance in voltage monitor 56 and actuates relay R3 while contact R2-2 deenergizes relay R1 to disconnect the battery and terminate the test.

At the completion of the test the ampere-hour counter 48 is checked to see if the battery delivered its rated output. If so, the recording chart 47 is removed, the ampere-hour total marked on the chart and the chart placed in the battery's file. If the battery was disconnected prematurely a manual check of all cells may be performed to locate possible weak or faulty cells. Once these cells are located they can be replaced and the battery put back in operation in top condition.

From the foregoing it will be seen that I have provided an automatic battery discharger and tester which monitors and records the electromatic values of a battery under test and which compares these values with preselected constant discharge rate of the battery until a preselected discharged condition.

I claim:

1. An automatic battery discharger and recorder comprising in combination:
   a. a circuit including a plurality of fixed resistors,
   b. manual means connected with said fixed resistors for selecting at least one of said resistors and connecting it in said circuit to form a base resistance,
   c. a variable resistor connected in said circuit in series with said fixed resistors, said base resistance and said variable resistance together comprising a load resistance through which a battery is discharged,
   d. means in said circuit for selecting a desired current rate for a battery,
   e. current monitor means in said circuit for comparing the current discharge rate of the battery with the desired selected current rate,
   f. servo means in said circuit responsive to a difference in said battery current discharge rate and the selected current rate as detected by said current monitor means and operable to adjust said variable resistor whereby the actual discharge current equals the selected current,
   g. recorder means in said circuit to record the time, voltage and current of discharge,
   h. voltage dropout means including sensing means for comparing the instantaneous battery voltage with a preselected dropout voltage and for sensing the value of the combined load resistance, said dropout means operable to trip a voltage relay when the battery voltage equals the selected voltage and the load resistance is insufficient for the test to automatically terminate a test until a different base resistance is selected from said fixed resistors to render said load resistance sufficient for the test, and
   i. means to adjust the voltage value at which said voltage dropout means is operable.

2. The device of claim 1 wherein warning means are provided in said circuit at both the high and low ends of the variable resistor (c) whereby an operator is warned when the variable resistor is incapable of maintaining the desired current.